United States Patent
Pulkrabek et al.

(10) Patent No.: US 12,484,564 B2
(45) Date of Patent: Dec. 2, 2025

(54) ANTI-REVERSE MECHANISM FOR FISHING REEL

(71) Applicant: TrikaUSA Inc., Superior, WI (US)

(72) Inventors: Larry Pulkrabek, Superior, WI (US); Matt Haas, Superior, WI (US)

(73) Assignee: TRIKAUSA INC., Superior, WI (US)

( * ) Notice: Subject to any disclaimer, the term of this patent is extended or adjusted under 35 U.S.C. 154(b) by 365 days.

(21) Appl. No.: 18/095,688

(22) Filed: Jan. 11, 2023

(65) Prior Publication Data

US 2023/0232802 A1 Jul. 27, 2023

Related U.S. Application Data

(60) Provisional application No. 63/303,671, filed on Jan. 27, 2022.

(51) Int. Cl.
*A01K 89/01* (2006.01)
*A01K 89/015* (2006.01)

(52) U.S. Cl.
CPC ...... *A01K 89/0182* (2015.05); *A01K 89/0185* (2015.05)

(58) Field of Classification Search
CPC .......... A01K 89/0117; A01K 89/01082; A01K 89/01083; A01K 89/01085; A01K 89/01086; A01K 89/02; A01K 89/011222; A01K 89/011223; A01K 89/0106; A01K 89/0182; A01K 89/0185
See application file for complete search history.

(56) References Cited

U.S. PATENT DOCUMENTS

| | | | | |
|---|---|---|---|---|
| 5,649,671 A | * | 7/1997 | L'Host ............... | A01K 89/0117 74/577 M |
| 5,746,297 A | * | 5/1998 | Park .................. | A01K 89/0117 188/82.4 |
| 6,517,021 B2 | | 2/2003 | Ikuta | |
| 6,517,201 B2 | * | 2/2003 | Qi ..................... | G01M 11/0228 351/41 |
| 7,198,219 B1 | * | 4/2007 | Alajajyan .......... | A01K 89/0183 242/290 |
| 9,468,199 B2 | * | 10/2016 | Takamatsu .......... | A01K 89/015 |
| 9,930,875 B2 | * | 4/2018 | Nagai ................. | A01K 89/053 |
| 10,253,826 B2 | * | 4/2019 | Ahmad ............. | A01K 89/0155 |

* cited by examiner

*Primary Examiner* — Anna M Momper

(74) *Attorney, Agent, or Firm* — Foley & Lardner LLP

(57) ABSTRACT

A fishing reel includes a frame and an anti-reverse mechanism. The anti-reverse mechanism includes a drive member, a ratchet plate, a biasing member, and engagement members. The ratchet plate is rotatably coupled with the drive member. The biasing member is frictionally engaged with the ratchet plate and the drive member. The engagement members pivotally couple with the frame and can be pivoted by the biasing member as the biasing member rotates. The engagement members are driven to pivot out of engagement with the ratchet plate as the biasing member rotates in a first direction to allow rotation of the drive member in the first direction. The engagement members are driven to pivot into engagement with the ratchet plate as the biasing member rotates in the second direction to limit further rotation of the drive member in the second direction.

18 Claims, 14 Drawing Sheets

ANTI-REVERSE MECHANISM FOR FISHING REEL

CROSS-REFERENCE TO RELATED PATENT APPLICATION

This application claims the benefit of and priority to U.S. Provisional Application No. 63/303,671, filed Jan. 27, 2022, the entire disclosure of which is incorporated by reference herein.

BACKGROUND

The present disclosure relates generally to fishing reels. More particularly, the present disclosure relates to drive mechanisms for fishing reels.

SUMMARY

One embodiment of the present disclosure is a fishing reel. In some embodiments, the fishing reel includes a frame, and an anti-reverse mechanism. In some embodiments, the anti-reverse mechanism includes a drive member, a ratchet plate, a biasing member, and multiple engagement members. In some embodiments, the ratchet plate rotatably is coupled with the drive member. In some embodiments, the biasing member is frictionally engaged with the ratchet plate and the drive member. In some embodiments, the engagement members are pivotally coupled with the frame and are configured to be pivoted by the biasing member as the biasing member rotates. In some embodiments, the engagement members are configured to driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

In some embodiments, the engagement members are pawls. In some embodiments, the engagement members are not driven to pivot by springs. In some embodiments, the biasing member is positioned within a space between the ratchet plate and an annular protrusion of the drive member. In some embodiments, the biasing member is configured to float within the space between the ratchet plate and the annular protrusion of the drive member. In some embodiments, the space between the ratchet plate and the annular protrusion of the drive member is filled with a lubricant.

In some embodiments, each of the engagement members include a hooked end configured to engage teeth of the ratchet plate. In some embodiments, the engagement members are pivotable relative to the frame an angular amount between a first angular position and a second angular position. In some embodiments, in the first angular position, the engagement members are configured to engage the ratchet plate to limit further rotation of the drive member in the second direction. In some embodiments, in the second angular position, the engagement members do not engage the ratchet plate to allow further rotation of the drive member in the first direction.

In some embodiments, the engagement members are transitionable between the first angular position and the second angular position by the drive member and the biasing member rotating in the first direction or the second direction a corresponding angular amount. In some embodiments, the drive member is configured to drive a spool of the fishing reel through a drag mechanism. In some embodiments, the drag mechanism is configured to allow rotation of the spool in a direction that back-drives the drive member in the second direction such that the engagement members limit further rotation of the ratchet plate. In some embodiments, the spool rotates in the direction to let out fishing line while the drag mechanism exerts drag on the spool. In some embodiments, rotation of the drive member causes the engagement members of the anti-reverse mechanism to transition between an engaged position in which the engagement members engage the ratchet plate to limit rotation of the drive member in the second direction, and a disengaged position in which the engagement members do not engage the ratchet plate to allow rotation of the drive member in the first direction.

Another embodiment of the present disclosure is a fishing rod assembly. In some embodiments, the fishing rod assembly includes a rod, and a fishing reel. In some embodiments, the fishing reel includes a frame and an anti-reverse mechanism. In some embodiments, the anti-reverse mechanism includes a drive member, a ratchet plate, a biasing member, and multiple engagement members. In some embodiments, the ratchet plate is rotatably coupled with the drive member. In some embodiments, the biasing member is frictionally engaged with the ratchet plate and the drive member. In some embodiments, the engagement members are pivotally coupled with the frame and are configured to be pivoted by the biasing member as the biasing member rotates. In some embodiments, the engagement members are configured to driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

In some embodiments, the engagement members are pawls. In some embodiments, the engagement members are not driven to pivot by springs.

In some embodiments, the biasing member is positioned within a space between the ratchet plate and an annular protrusion of the drive member. In some embodiments, the biasing member is configured to float within the space between the ratchet plate and the annular protrusion of the drive member.

In some embodiments, the space between the ratchet plate and the annular protrusion of the drive member is filled with a lubricant. In some embodiments, the engagement members include a hooked end configured to engage teeth of the ratchet plate.

In some embodiments, the engagement members are pivotable relative to the frame an angular amount between a first angular position and a second angular position. In some embodiments, in the first angular position, the engagement members are configured to engage the ratchet plate to limit further rotation of the drive member in the second direction. In some embodiments, in the second angular position, the engagement members do not engage the ratchet plate to allow further rotation of the drive member in the first direction. In some embodiments, the engagement members are transitionable between the first angular position and the second angular position by the drive member and the biasing member rotating in the first direction or the second direction a corresponding angular amount.

In some embodiments, the drive member is configured to drive a spool of the fishing reel through a drag mechanism. In some embodiments, the drag mechanism is configured to allow rotation of the spool in a direction that back-drives the drive member in the second direction such that the engagement members limit further rotation of the ratchet plate. In some embodiments, the spool rotates in the direction to let out fishing line while the drag mechanism exerts drag on the spool.

In some embodiments, rotation of the drive member causes the engagement members of the anti-reverse mechanism to transition between an engaged position and a disengaged position. In some embodiments, in the engaged position, the engagement members engage the ratchet plate to limit rotation of the drive member in the second direction. In some embodiments, in the disengaged position, the engagement members do not engage the ratchet plate to allow rotation of the drive member in the first direction.

Another embodiment of the present disclosure is an anti-reverse mechanism for a fishing reel. The anti-reverse mechanism includes a drive member, a ratchet plate, a biasing member, and engagement members. The ratchet plate is rotatably coupled with the drive member. In some embodiments, the biasing member is frictionally engaged with the ratchet plate and the drive member. In some embodiments, the engagement members are pivotally coupled with a frame and are configured to be pivoted by the biasing member as the biasing member rotates. In some embodiments, the engagement members are configured to be driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
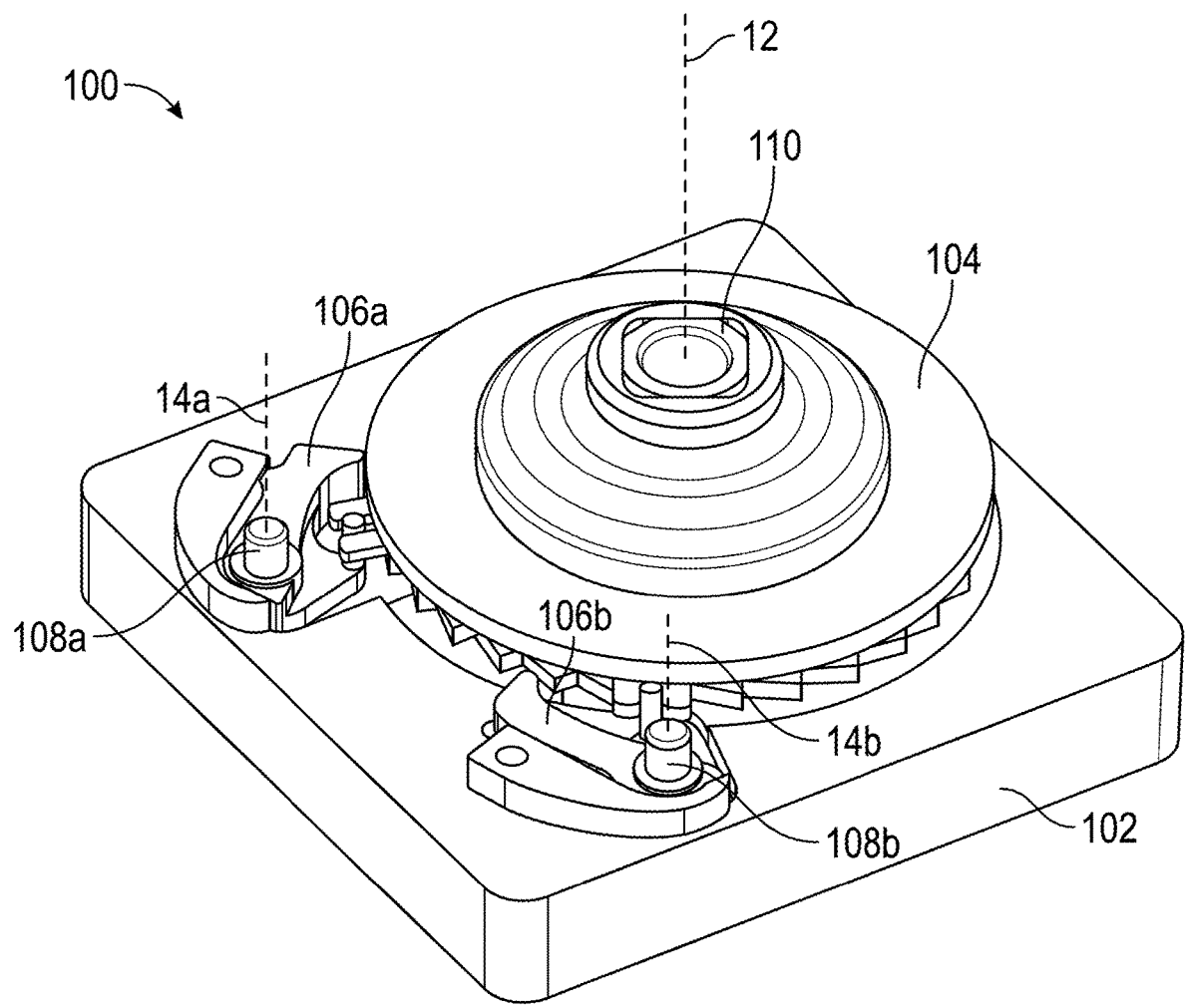
FIG. 1 is a perspective view of an anti-reverse mechanism for a fishing reel, according to an exemplary embodiment.

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, an anti-reverse mechanism for a fishing reel includes a drive member, a ratchet plate, a biasing member, and multiple pawls. The pawls are pivotally coupled with a frame of the fishing reel. The pawls can be coupled with the biasing member, so that rotation of the biasing member in either direction causes the pawls to be pivoted into an engaged position and a disengaged position, respectively. The ratchet plate is fixedly coupled with the drive member such that rotation of the drive member causes rotation of the ratchet plate. The drive member can also be coupled with a shaft that drives a spool of the fishing reel. The biasing member is positioned between an annular protrusion of the drive member and the ratchet plate. The biasing member may float and frictionally engage with the drive member. When the drive member is rotated in a first direction, the frictional engagement is sufficient to rotate the biasing member to drive the pawls to pivot into the disengaged position. The drive member may continue to rotate in the first direction (e.g., relative to the biasing member) as the pawls are maintained in the disengaged position. When the drive member is rotated in a second direction, the frictional engagement between the drive member and the biasing member is sufficient to drive the biasing member to rotate in the second direction, thereby driving the pawls to pivot into the engaged position and engage teeth of the ratchet plate. The pawls engage the ratchet plate to limit further rotation of the ratchet plate and the drive member in the second direction. Advantageously, the anti-reverse mechanism uses the biasing member and does not use torsional springs, which may wear over time, require replacement, and drive the pawls into continual re-engagement with each of the teeth of the ratchet plate as the ratchet plate rotates. Since the biasing member maintains the pawls out of engagement with the teeth of the ratchet plate as the drive member and the ratchet plate rotate freely in the first direction, the pawls do not "click" due to continual re-engagement with each of the teeth of the ratchet plate, thereby facilitating a quieter anti-reverse mechanism. Further due to the biasing member maintaining the pawls out of engagement with the teeth of the ratchet plate as the drive member and the ratchet plate rotate freely in the first direction, the anti-reverse mechanism has a smoother, bumpless feel for the operator of the fishing reel that drives the drive member.

Anti-Reverse Mechanism

As shown in the exemplary embodiment of FIGS. 1-11, an anti-reverse mechanism 100 (e.g., a drive) configured for use with a fishing reel (e.g., a fishing rod, a line retrieval device, a baitcaster, a fishing apparatus, a fishing assembly, a spinner, etc.) includes or is coupleable with a fishing reel frame 102 (e.g., a frame, a structural member, a support, etc.), a drive member 104 (e.g., a drive plate, a drive, etc.), a biasing member 114 (e.g., a biasing plate, a biaser, etc.), a ratchet member 112 (e.g., a ratchet plate, a ratchet, a toothed drive member, a gear plate, a gear, etc.), engagement members 106 (e.g., pawls, hooks, interfacing members, etc.), and a driveshaft 110 (e.g., a shaft, a drive member, a handle, a rod, etc.). The anti-reverse mechanism 100 is configured to receive an input torque or input rotation about an axis 12 that extends centrally through the driveshaft 110. The driveshaft 110 can be coupled with (e.g., fixedly coupled) with a handle of a fishing reel for providing input torque to the anti-reverse mechanism 100. The anti-reverse mechanism 100 can be a portion of a drive or a driveline of a fishing reel (e.g., a baitcaster) and allows rotation or driving of the drive of the fishing reel in a first direction and limit or restrict driving of the drive of the fishing reel in a second direction opposite the first direction.

Figure 9:
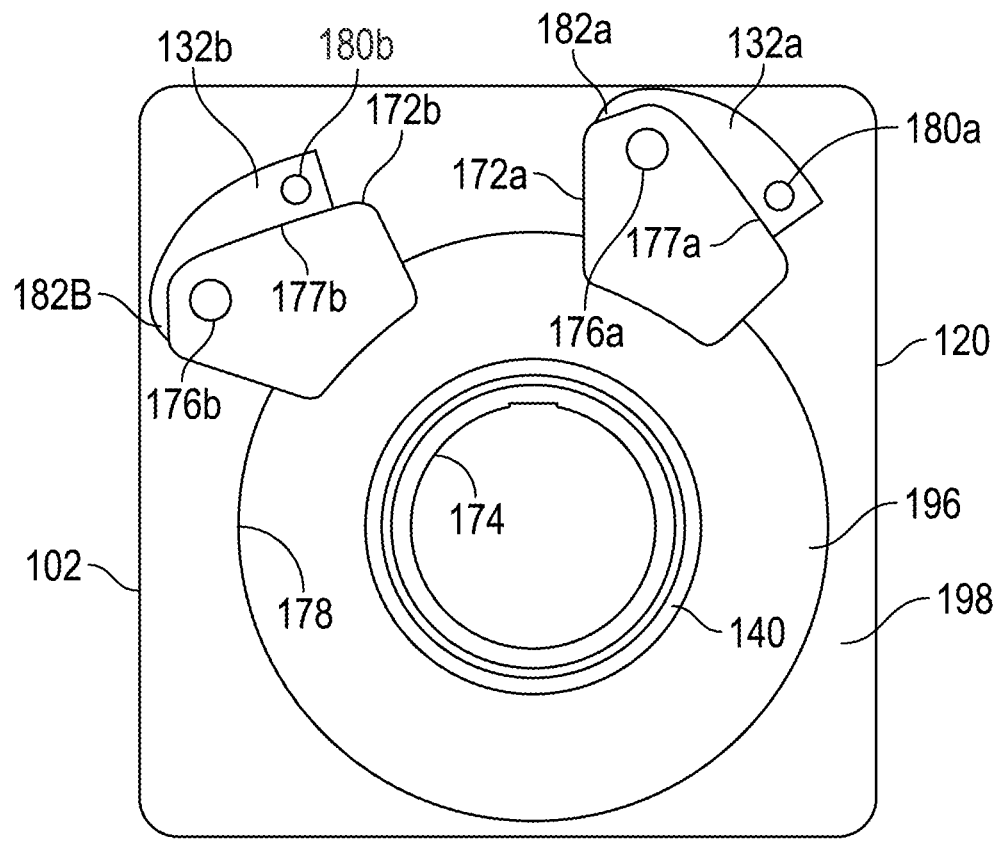
FIG. 9 is a view of a frame of the anti-reverse mechanism of FIG. 1.

As shown in FIGS. 1 and 5-7, the driveshaft 110 is received within and extends through an opening 174 (e.g., a hole, a bore, of the fishing reel frame 102. The opening 174 of the fishing reel frame 102 is defined centrally within an annular protrusion 140 (e.g., a rim, a circular protrusion, an annular flange, etc.) that extends from a surface 196 of the fishing reel frame 102 that faces the biasing member 114, the ratchet member 112, and the drive member 104. The surface 196 is sub-flush relative to a surface 198 of the fishing reel frame 102. The surface 196 is defined within a recess 135 (e.g., a circular recess) of the fishing reel frame 102. The engagement members 106 are pivotally coupled with the fishing reel frame 102 through pins 108 that are received within openings 176 of the fishing reel frame 102 as shown in FIG. 9. The anti-reverse mechanism 100 includes a bearing 116 (e.g., a ball bearing, a roller bearing, etc.) that is positioned within the opening 174 of the fishing reel frame 102, or more specifically, within the annular protrusion 140 of the fishing reel frame 102. An outer race of the bearing 116 (e.g., a radially outwards facing surface of the bearing 116) couples with, directly engages, contacts, abuts, etc., a radially inwards facing surface of the fishing reel frame 102. An inner race of the bearing 116 couples with, directly engages, contacts, abuts, etc., a radially outwards facing surface of the driveshaft 110. The driveshaft 110 includes teeth 130 that extend along the outer surface of the driveshaft 110 and are configured to engage, mesh with, etc., another member of a driveline of the fishing reel (e.g., a spool, another gear, etc.) for driving the fishing reel to take up fishing line. The driveshaft 110, the drive member 104, the biasing member 114, the ratchet member 112, and the bearing 116 are all co-axial and concentric with the axis 12.

Figure 2:
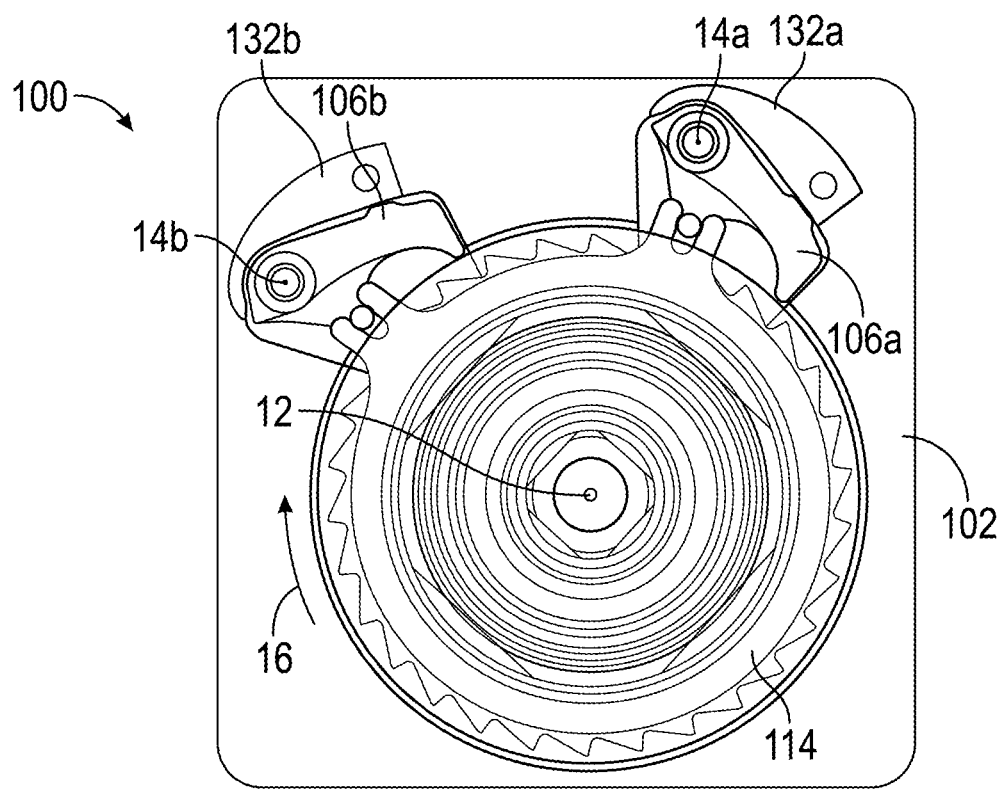
FIG. 2 is a side view of the anti-reverse mechanism of FIG. 1 in a disengaged state.
Figure 3:
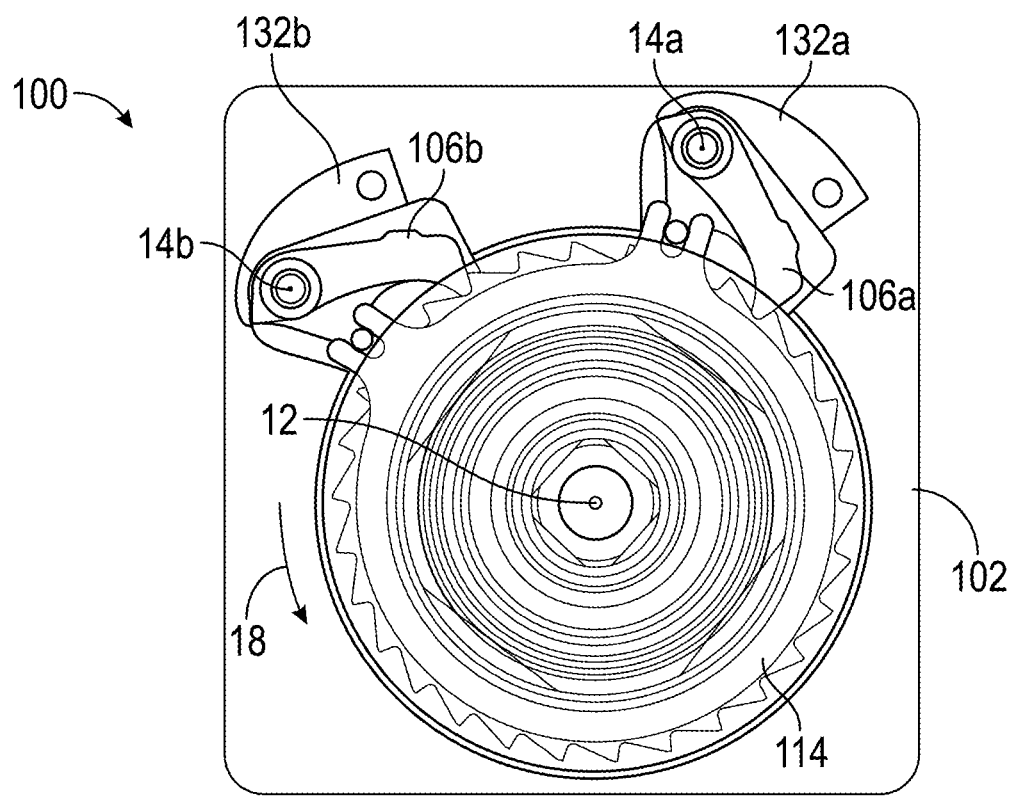
FIG. 3 is a side view of the anti-reverse mechanism of FIG. 1 in an engaged state.

As shown in FIGS. 1-3 and 5-7, the biasing member 114 is positioned between the drive member 104 and the ratchet member 112. The ratchet member 112 is positioned between the biasing member 114 and the fishing reel frame 102. The biasing member 114 is configured to engage with the engagement members 106 to drive the engagement member 106 to pivot about axes 14. In particular, the anti-reverse mechanism 100 includes a first engagement member 106a and a second engagement member 106b that pivot about axis 14a and axis 14b, respectively, with axis 14a and axis 14b being defined by pin 108a and pin 108b, respectively. When the driveshaft 110 is driven to rotate in a clockwise direction 16 about the axis 12 as shown in FIG. 2, the biasing member 114 is rotated in the clockwise direction 16 and drives the engagement members 106 to pivot about axes 14 (in a counter-clockwise direction) so that the engagement members 106 do not engage the ratchet member 112. When the driveshaft 110 is driven to rotate in a counter-clockwise direction 18 about the axis 12 as shown in FIG. 3, the biasing member 114 is rotated in the counter-clockwise direction 18 and drives the engagement members 106 to pivot about axes 14 in a clockwise direction so that the engagement members 106 engage the ratchet member 112, thereby limiting further rotation of the ratchet member 112, the drive member 104, and the driveshaft 110 in the counter-clockwise direction 18.

Figure 8:
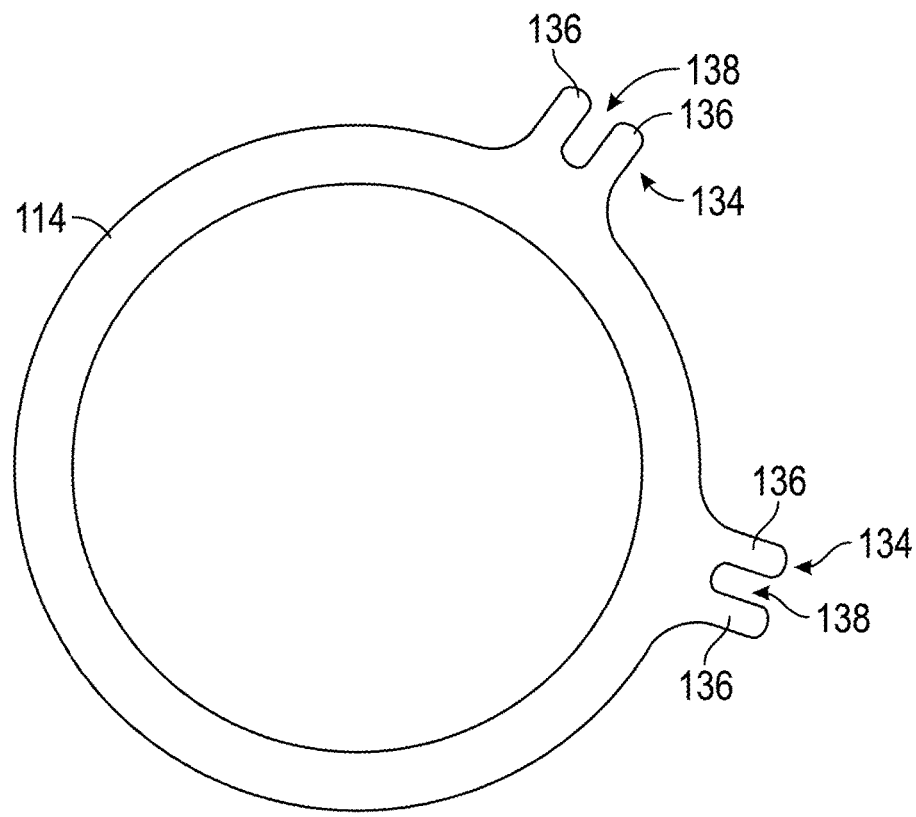
FIG. 8 is a view of the biasing member of FIG. 7.

As shown in FIG. 8, the biasing member 114 has the form of an annular ring defining a central opening. The biasing member 114 includes a first engagement portion 134 and a second engagement portion 134. The biasing member 114 can generally have the form of a Geneva wheel. Each of the engagement portions 134 are positioned at different radial positions of the biasing member 114. Each of the engagement portions 134 include a pair of protrusions 136 that extend along chords of the biasing member 114. The protrusions 136 define an open-ended slot 138 therebetween that are configured to receive a portion of the engagement members 106 (e.g., a pin of each of the engagement members 106). The engagement portions 134 are positioned on the biasing member 114 adjacent the engagement members 106 (e.g., at radial positions proximate the engagement members 106). The biasing member 114 can include any number of engagement portions 134 such as greater than or less than two as shown in FIG. 8. The biasing member 114 generally has a number of engagement portions 134 and open-ended slots 138 equal to a number of engagement members 106.

Figure 10:
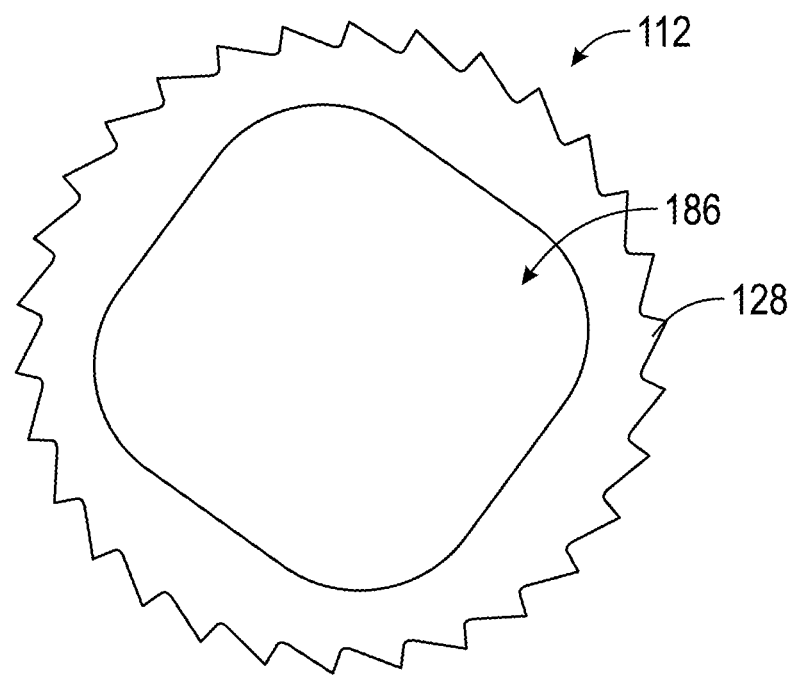
FIG. 10 is a view of the ratchet plate of FIG. 7.

As shown in FIG. 10, the ratchet member 112 includes ratchet teeth 128 formed along an outer periphery of the ratchet member 112. The ratchet teeth 128 may each include a generally flat side and an angled side, with the generally flat side being configured to engage with a corresponding portion or end of the engagement members 106 to limit driving the ratchet member 112 in the counter-clockwise direction 18 as shown in FIG. 3. The ratchet member 112 has a ring shape, with a square opening 186 (e.g., a hole, a window, etc.) having chamfered or rounded corners. The square opening 186 has a shape that is configured to engage with or interlock with a corresponding portion of the drive member 104 to fixedly couple the ratchet member 112 with the drive member 104.

Figure 6:
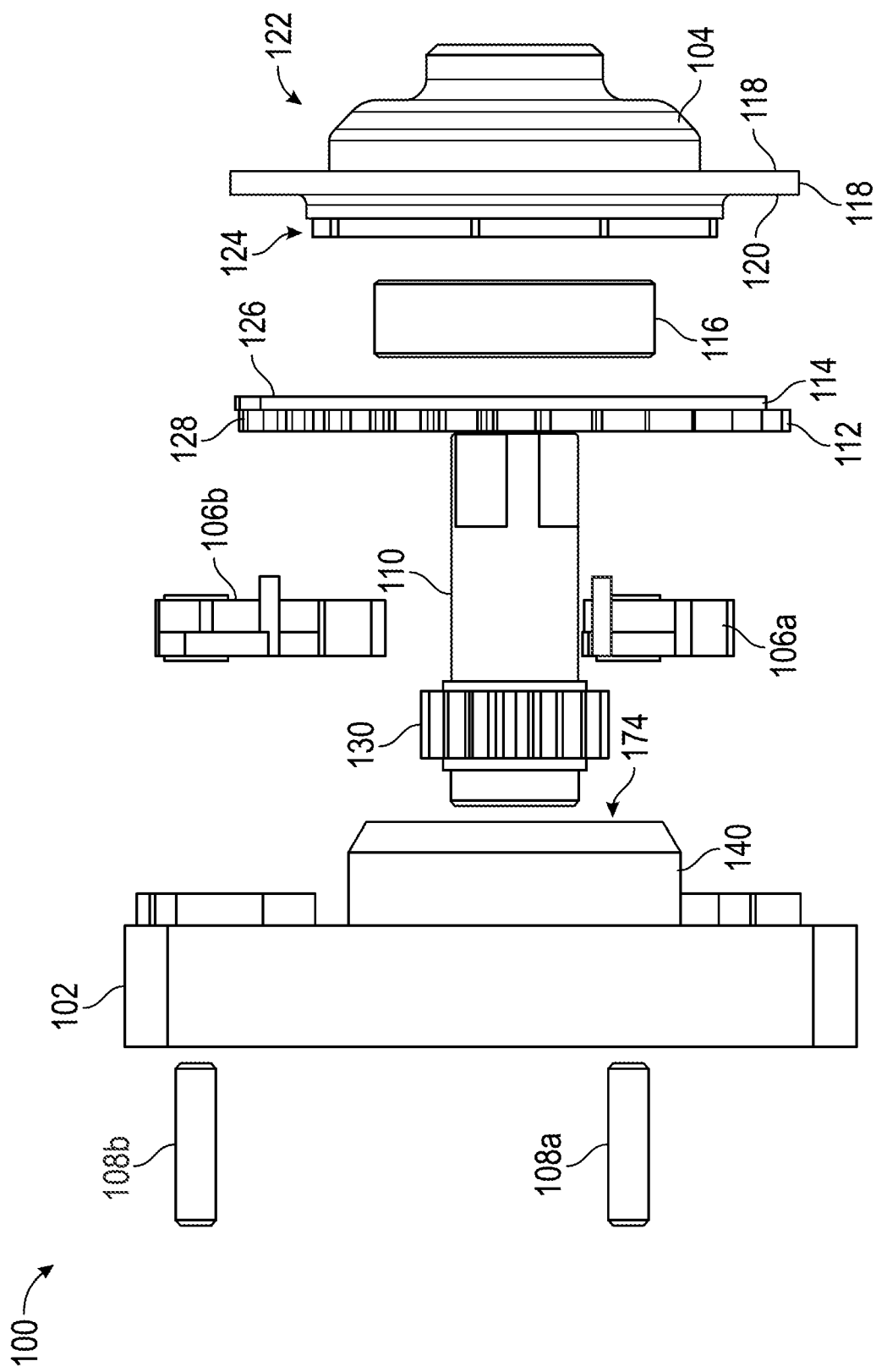
FIG. 6 is a side exploded view of the anti-reverse mechanism of FIG. 1.
Figure 7:
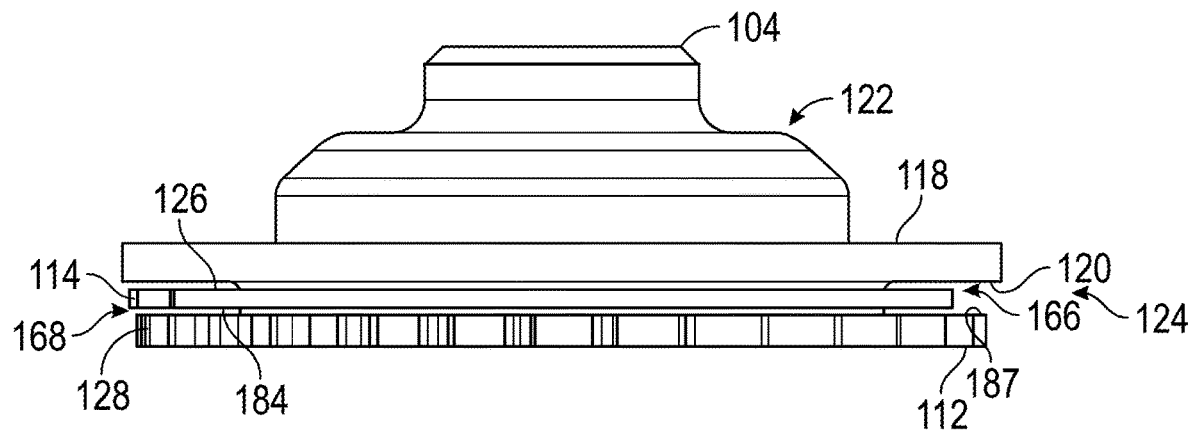
FIG. 7 is a side view of a drive member, a biasing member, and a ratchet plate of the anti-reverse mechanism of FIG. 1.
Figure 11:
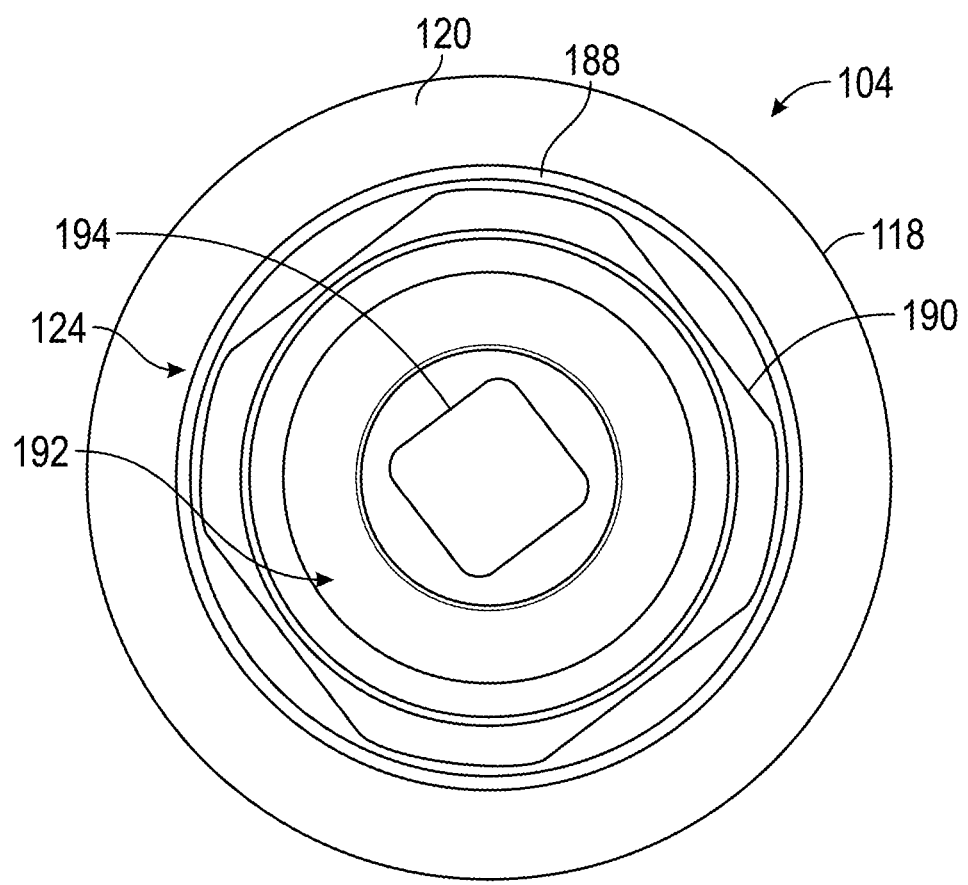
FIG. 11 is a view of the drive member of FIG. 7.

As shown in FIGS. 6, 7, and 11, the drive member 104 includes a first portion 122, an annular protrusion 118, and a second portion 124. The first portion 122 and the second portion 124 are positioned on opposite sides of the annular protrusion 118, with the annular protrusion 118 positioned between the first portion 122 and the second portion 124. The first portion 122 may include a first sub-portion having a first outer radius and a second sub-portion having a second outer radius that is less than the first outer radius, with the first sub-portion proximate the annular protrusion 118. A step or shoulder is defined between the first sub-portion and the second sub-portion of the first portion 122. The second portion 124 has an outer radius that is greater than the outer radius of the first sub-portion and the second sub-portion of the first portion 122. The second portion 124 is configured to receive the biasing member 114 with the biasing member 114 being capable of rotating relative to the second portion 124. The biasing member 114 is received along an outer surface 188 of the second portion 124. The central opening of the biasing member 114 can have a radius that is greater than a radius of the outer surface 188 of the second portion 124 so that the biasing member 114 is free to rotate or float along the second portion 124. The drive member 104 includes an inner volume 192 defined within the first portion 122 and the second portion 124. The drive member 104 is configured to receive the bearing 116 within the inner volume 192, and a radially inwards facing surface of the drive member 104 at the first portion 122 (e.g., the first sub-portion of the first portion 122) has a radius or diameter corresponding to an outer radius or diameter of the bearing 116 so that the outer race of the bearing 116 frictionally couples with the radially inwards facing surface of the drive member 104.

The drive member 104 also includes an opening 194 having a same shape as a cross-sectional shape of the driveshaft 110 at an end of the driveshaft 110 that is received through the inner volume 192 of the drive member 104. The opening 194 and the end of the driveshaft 110 may have corresponding square cross-sectional shape as shown in FIGS. 11 and 6 or may have any other shape. The end of the driveshaft 110 is received through the opening 194 to fixedly couple the driveshaft 110 with the drive member 104. In other embodiments, the driveshaft 110 and the drive member 104 are otherwise fixedly coupled with each other, such as frictionally fit, fastened, integrally formed, etc.

As shown in FIG. 11, the drive member 104 includes a protrusion 190 formed along a longitudinal end of the drive member 104. Specifically, the protrusion 190 is formed along an outer face of the drive member 104 that faces the fishing reel frame 102. The protrusion 190 has a square shape that corresponds to a shape of the square opening 186 of the ratchet member 112. The ratchet member 112 is received on the outer face of the drive member 104 that faces the fishing reel frame 102 and interlocks with the drive member 104 through the protrusion 190 and the square opening 186 so that the ratchet member 112 is fixedly coupled with the drive member 104.

As shown in FIG. 7, the biasing member 114 is positioned on the second portion 124 between the annular protrusion 118 and the ratchet member 112. The biasing member 114 floats between the annular protrusion 118 and the ratchet member 112. A first gap 166 is defined between the biasing member 114 and the annular protrusion 118 and a second gap 168 is defined between the biasing member 114 and the ratchet member 112. The biasing member 114 defines a first face 126 and a second face 184 on opposite longitudinal sides of the biasing member 114. The first face 126 faces a corresponding face 120 of the annular protrusion 118 and is configured to contact, abut, frictionally engage, etc., the corresponding face 120 of the annular protrusion 118. The first gap 166 and the second gap 168 can be filled with grease or a lubricant to facilitate float of the biasing member 114. The biasing member 114 and the annular protrusion 118 of the drive member 104 may have sufficient frictional engagement (e.g., between the first face 126 and the corresponding face 120 of the annular protrusion 118) or drag so that when the drive member 104 is rotated in the clockwise direction 16 or the counter-clockwise direction 18 as shown in FIGS. 2 and 3, the biasing member 114 is driven to rotate between the angular positions shown in FIGS. 2 and 3 to thereby pivot the engagement members 106 so that the engagement members 106 either engage the teeth 128 of the ratchet member 112 as shown in FIG. 3, or are pivoted so that the ratchet member 112 and the drive member 104 can rotate freely in the clockwise direction 16 without engagement of the engagement members 106. Advantageously, providing the floating biasing member 114 with a frictional engagement between the first surface 126 and the corresponding surface 120 of the annular protrusion 118 of the drive member 104 selectably pivots the engagement member 106 to limit backdrive of the driveshaft 110 without requiring springs to drive pawls into engagement with teeth of a ratchet member.

As shown in FIG. 7, the ratchet member 112 also defines a surface 187 that faces the biasing member 114. The surface 187 may contact, directly engage, abut, etc., a shoulder of the second portion 124 of the drive member 104 at the protrusion 190 of the drive member 104. When the biasing member 114 floats, the biasing member 114 may sometimes contact or abut the surface 187 of the ratchet member 112 and be limited from translating further along the axis 12 towards the ratchet member 112.

Figure 4:
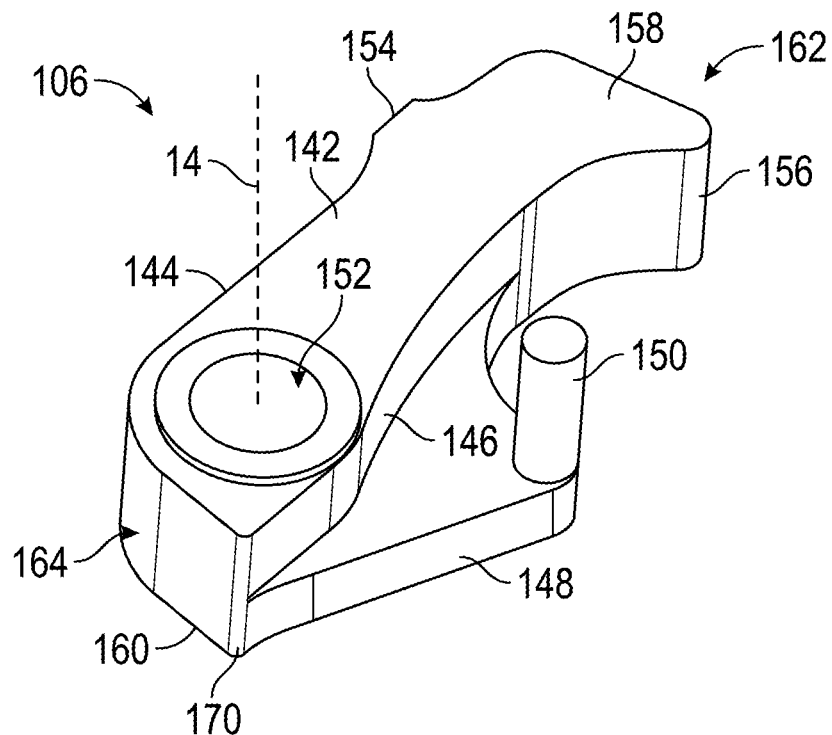
FIG. 4 is a perspective view of a pawl of the anti-reverse mechanism of FIG. 1.
Figure 5:
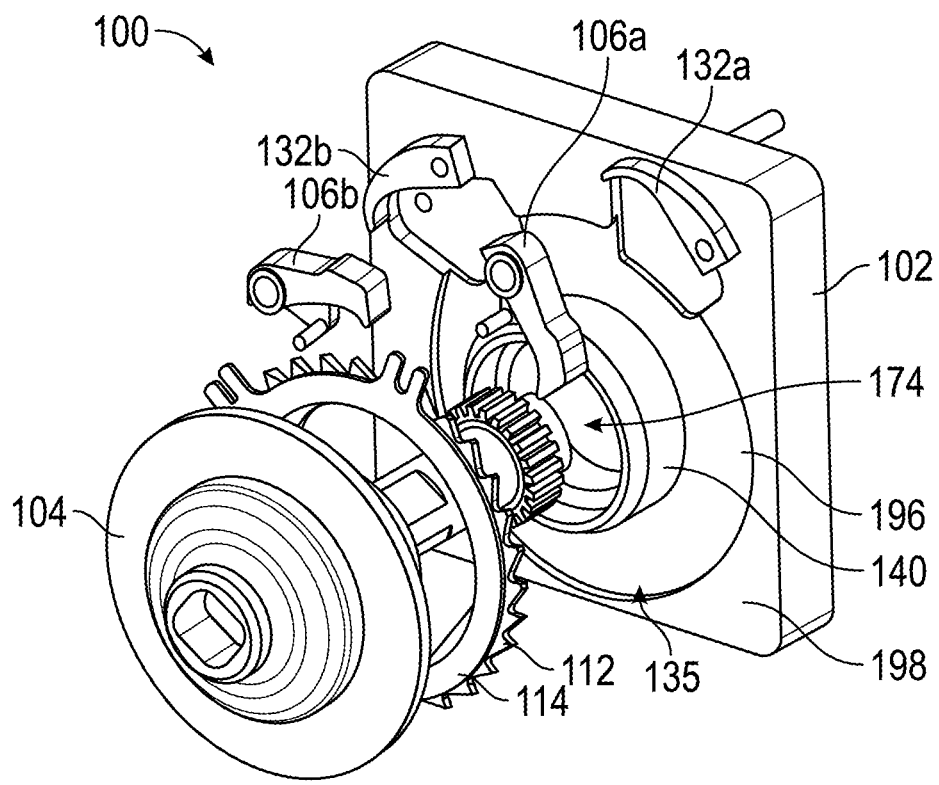
FIG. 5 is a perspective exploded view of the anti-reverse mechanism of FIG. 1.

As shown in FIG. 4, each of the engagement members 106 has the shape of a pawl or a hooked member and includes a first body 142 defining a main portion of the engagement member 106, and a second body 148 defining a secondary portion of the engagement member 106. The first body 142 defines a first end 162, a second end 164, a first side 144, a second side 146, a first face 158, and a second face 160. The first face 158 and the second face 160 are flat surfaces that are substantially parallel with at least one of the surface 196 of the fishing reel frame 102, the corresponding surface 120 of the annular protrusion 118 of the drive member 104, the first surface 126 of the biasing member 114, the second face of the biasing member 114, or the surface 187 of the ratchet member 112. The engagement member 106 includes a stop 154 (e.g., a flat surface) on the first side 144 proximate the first end 162. The stop 154 may be configured to engage, directly contact, etc., a corresponding portion or surface of the fishing reel frame 102 to limit rotation of the engagement member 106 in a counter-clockwise direction about axis 14.

The first body 142 includes a hook 156 at the first end 162 of the engagement member 106. The hook 156 is defined at a corner at the first end 162 adjacent the second side 146. The second side 146 may have an overall arcuate shape along a length of the engagement member 106 to define the hook 156. The second body 148 has an overall thickness that is less than an overall thickness of the first body 142 as defined between the first face 158 and the second face 160 of the first body 142. The second body 148 can have a bottom face that is co-planar with the second face 160 of the first body 142. The second body 148 has a generally triangular shape and is integrally formed with the first body 142 along the second side 146. The second body 148 extends from the second side 146 and includes a post or pin 150 that extends from the second body 148 (e.g., at an apex of the second body 148) in a direction substantially parallel with the axis 14. The pin 150 may extend from the bottom surface of the second body 148 past the first face 158. The pin 150 has an overall height that is greater than the thickness of the first body 142 between the first face 158 and the second face 160. The pin 150 has a diameter or radius so that the pin 150 can be received within the open-ended slot 138 of the biasing member 114. The protrusions 136 may engage the pin 150 to drive the engagement member 106 to rotate about axis 14 in either direction as the biasing member 114 is driven to rotate.

As shown in FIG. 4, the first body 142 also includes an opening, a bore, an aperture, a hole, etc., shown as bore 152, that is configured to receive the pin 108. The pin 108 and the bore 152 facilitate pivotally or rotatably coupling the engagement member 106 on the fishing reel frame 102. The first body 142 also includes a corner 170 on the second end 164 adjacent the second side 146. The corner 170 may be configured to engage a corresponding portion or part of the fishing reel frame 102 when the engagement member 106 rotates about axis 14 in a clockwise direction to its limit, to thereby limit further rotation of the engagement member 106 in the clockwise direction.

As shown in FIG. 9, the fishing reel frame 102 includes a first recess 172a at which the first engagement member 106a is positioned, and a second recess 172b at which the second engagement member 106b is positioned. The first engagement member 106a and the second engagement member 106b may be similarly configured and coupled with the fishing reel frame 102 such that whatever is said of the configuration of the first engagement member 106a on the fishing reel frame 102 at the first recess 172a may also be said of the second engagement member 106b on the fishing reel frame 102 at the second recess 172b. Specifically, the first engagement member 106a and the second engagement member 106b are positioned within the first recess 172a and the second recess 172b, respectively. The first engagement member 106a is positioned at the first recess 172 proximate a circumferential periphery of the surface 196 which is recessed relative to the surface 198. An inner cylindrical surface 178 is defined between the surface 196 and the surface 198. The first recess 172a and the second recess 172b are positioned at different angular positions and extend across the inner cylindrical surface 178. The fishing reel frame 102 includes a first protrusion 132a and a second protrusion 132b that are positioned along an edge or periphery of the first recess 172a and the second recess 172b.

The first protrusion 132a and the second protrusion 132b are fixedly coupled with the fishing reel frame 102 through pins 180a and 180b, respectively, and include a hooked end 182a and 182b, respectively. The hooked ends 182a and 182b define a stop or an engagement surface that is configured to abut or contact a corresponding portion of the engagement members 106 to limit rotation of the engagement members 106 relative to the fishing reel frame 102 in a first direction. Specifically, the hooked ends 182a and 182b are configured to directly contact, abut, engage, etc., the corners 170 of the engagement members 106a and 106b when the engagement members 106a and 106b rotate about axes 14 in the first direction so that the hooks 156 engage or interlock with the ratchet teeth 128 of the ratchet member 112 as shown in FIG. 3.

As shown in FIG. 9, the fishing reel frame 102 includes openings 176a and 176b that are positioned within the recesses 172a and 172b proximate the hooked ends 182 of the protrusions 132. The openings 176a and 176b receive the pins 108a and 108b respectively and facilitate pivotally coupling the engagement members 106a and 106b with the fishing reel frame 102. The protrusion 132a and the recess 172a cooperatively define a surface or face 177a. The protrusion 132b and the recess 172b also cooperatively define a surface or face 177b. The face 177a and the face 177b are configured to abut, contact, directly engage, etc., the stops 154 of the first engagement member 106a and the second engagement member 106b, respectively, to limit rotation of the first engagement member 106a and the second engagement member 106b in a second direction about axes 14a and 14b, respectively, as shown in FIG. 2.

Referring again to FIGS. 2 and 3, when the driveshaft 110 is driven in the clockwise direction 16, the drive member 104 is driven in the clockwise direction 16 as well due to the fixed coupling between the driveshaft 110 and the drive member 104. The drive member 104 in turn drives the ratchet member 112. Due to frictional engagement between the biasing member 114 and the drive member 104, the biasing member 114 is also driven to pivot about the axis 12 in the clockwise direction 16 as the drive member 104 is driven in the clockwise direction 16. The biasing member 114 and the annular protrusion 118 of the drive member 104 may frictionally engage with each other at the first face 126 of the biasing member 114 and the corresponding face 120 of the annular protrusion 118.

The biasing member 114 can be driven to pivot an angular amount about the axis 12 until the engagement members 106 contact or engage the surfaces 177 of the fishing reel frame 102. Specifically, the biasing member 114 receives the pins 150 of the engagement members 106 within the slots 138 and thereby drives the engagement members 106 to pivot in a counter-clockwise direction about axes 14 until the stops 154 of the engagement members 106 contact or abut the surfaces 177 of the fishing reel frame 102, thereby limiting further rotation of the engagement members 106 in the counter-clockwise direction about axes 14. When the engagement members 106 are pivoted to contact the surfaces 177 at the stops 154 (e.g., when the engagement members 106 are in the angular position at shown in FIG. 2), the hooks 156 of the engagement members 106 are disengaged from the teeth 128 of the ratchet member 112, thereby allowing further rotation of the driveshaft 110, the drive member 104, and the ratchet member 112 in the clockwise direction 16. The engagement members 106 are maintained out of engagement with the teeth 128 of the ratchet member 112 in the angular position as shown in FIG. 2 as the driveshaft 110, the drive member 104, and the ratchet member 112 continue to rotate in the clockwise direction 16. Maintaining the engagement members 106 out of engagement with the teeth 128 of the ratchet member 112 allows for a smooth and silent drive of the driveshaft 110 in the clockwise direction 16 once the engagement members 106 are driven to the angular position as shown in FIG. 2. Other anti-reverse ratchet systems use springs (e.g., torsional springs) which causes pawls to engage with every tooth of a ratchet plate, which results in noisy operation as the pawls click into engagement with the teeth, and also results in a rough drive experience. Further, torsional springs can wear over time, resulting in required replacement or failure of the anti-reverse mechanism. However, the anti-reverse mechanism 100 described herein uses the biasing member 114 and the engagement members 106 to drive the engagement members 106 in and out of engagement with the ratchet member 112 through rotation of the driveshaft 110. This configuration does not use springs and thereby eliminates potential failure of the springs or required replacement.

When the driveshaft 110 is driven in the counter-clockwise direction 18 as shown in FIG. 3, the drive member 104 is also driven in the counter-clockwise direction 18 as well due to the fixed coupling between the driveshaft 110 and the drive member 104. The drive member 104 in turn drives the ratchet member 112. Due to frictional engagement between the biasing member 114 and the drive member 104, the biasing member 114 is also driven to pivot about the axis 12 in the counter-clockwise direction 18 as the drive member 104 is driven in the counter-clockwise direction 18. The biasing member 114 and the annular protrusion 118 of the drive member 104 may frictionally engage with each other at the first face 126 of the biasing member 114 and the corresponding face 120 of the annular protrusion 118.

The biasing member 114 can be driven to pivot an angular amount about the axis 12 until the hooks 156 of the engagement members 106 are pivoted to engage, are received within, etc., the teeth 128 of the ratchet member 112, and the corners 170 of the engagement members 106 are driven to contact the surface defined at the hooked ends 182 of the protrusions 132, thereby limiting further rotation of the engagement members 106 in the clockwise direction about axes 14. When the hooks 156 of the engagement members 106 engage the teeth 128 of the ratchet member 112, the ratchet member 112 and thereby the drive member 104 and the driveshaft 110 are limited from rotating further in the counter-clockwise direction 18.

In this way, the engagement members 106 can be driven by rotation of the driveshaft 110 to transition between an engaged angular position as shown in FIG. 3 and a disengaged angular position as shown in FIG. 2. In some embodiments, rotating the driveshaft 110 an angular amount $\Delta\theta_{engage}$ drives the engagement members 106 between the engaged angular position as shown in FIG. 3 and the disengaged angular position as shown in FIG. 2. For example, if the engagement members 106 are currently in the disengaged angular position as shown in FIG. 2, rotating the driveshaft 110 the angular amount $\Delta\theta_{engage}$ in the counter-clockwise direction 18 drives the engagement members 106 into the engaged angular position as shown in FIG. 3. Similarly, if the engagement members 106 are currently in the engaged angular position as shown in FIG. 3, rotating the driveshaft 110 in the clockwise direction 16 drives the engagement members 106 into the disengaged angular position as shown in FIG. 2. In this way, the biasing member 114 may be frictionally engaged with the driveshaft 110 as the driveshaft 110 rotates in either direction until the engagement members 106 are transitioned into the engaged angular position or the disengaged angular position. Once the engagement members 106 are in the engaged angular position, further rotation of the driveshaft 110 in the counter-clockwise direction 18 is limited, and the biasing member 114 maintains a current angular position until driven by the driveshaft 110 and the drive member 104 in the clockwise direction 16. Once the engagement members 106 are in the disengaged angular position, further rotation of the drive shaft 110 in the clockwise direction 16 is allowed, and the biasing member 114 maintains a current angular position until driven by the driveshaft 110 and the drive member 104 in the counter-clockwise direction 18.

Figure 12:
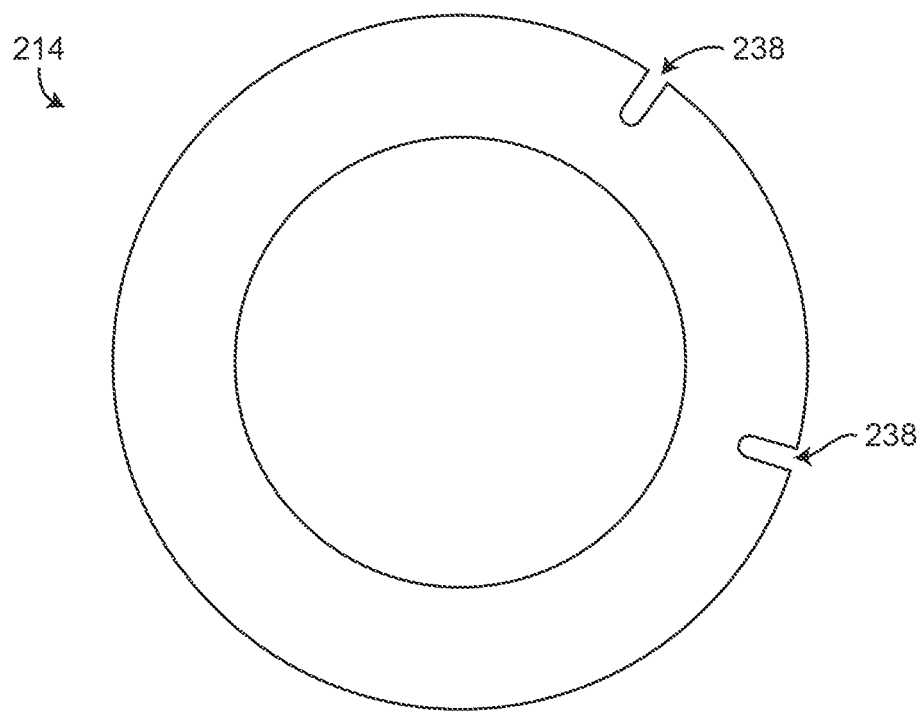
FIG. 12 is a view of the biasing member of FIG. 7, according to another embodiment.
Figure 13:
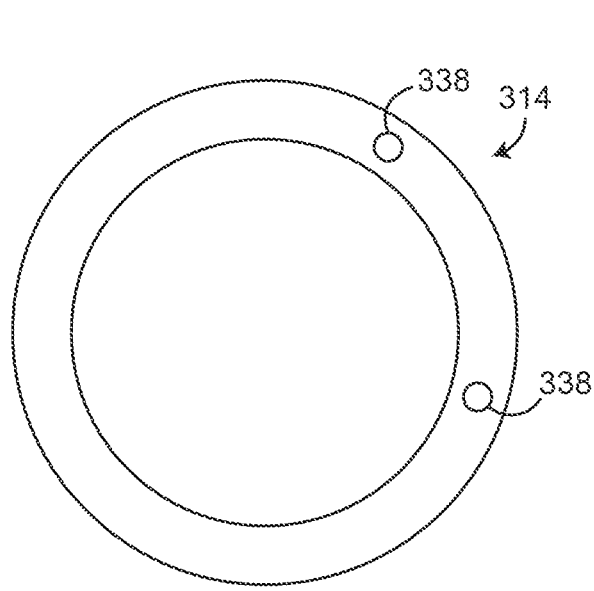
FIG. 13 is a view of the biasing member of FIG. 7, according to another embodiment.
Figure 14:
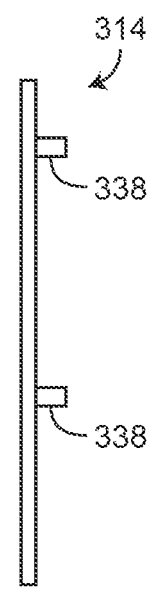
FIG. 14 is a side view of the biasing member of FIG. 13.

Referring to FIGS. 12-14, alternative embodiments of the biasing member 114 are shown. As shown in FIG. 12, an alternative biasing member 214 includes slots 238 (e.g., similarly positioned and sized as the slots 138 of biasing member 114), but does not include the protrusions 136. In this way, the biasing member 214 may be provided as a ring with slots for receiving the pins 150 of the engagement members 106. As shown in FIGS. 13 and 14, an alternative biasing member 314 may have the form of a ring (e.g., a flat ring, with a central opening) with pins 338 positioned at same angular positions as the slots 238. The pins 338 may be configured to be received within a slot or hole of the engagement members 106 to drive the engagement members 106 between the engaged angular position and the disengaged angular position. In some embodiments, the pins 150 are angled, slanted, have varying diameter along their height, etc., so that the rotational rate of the engagement members 106 is non-uniform, non-constant, or non-linear with respect to rotation of the biasing member 114.

Fishing Reel

Figure 15:
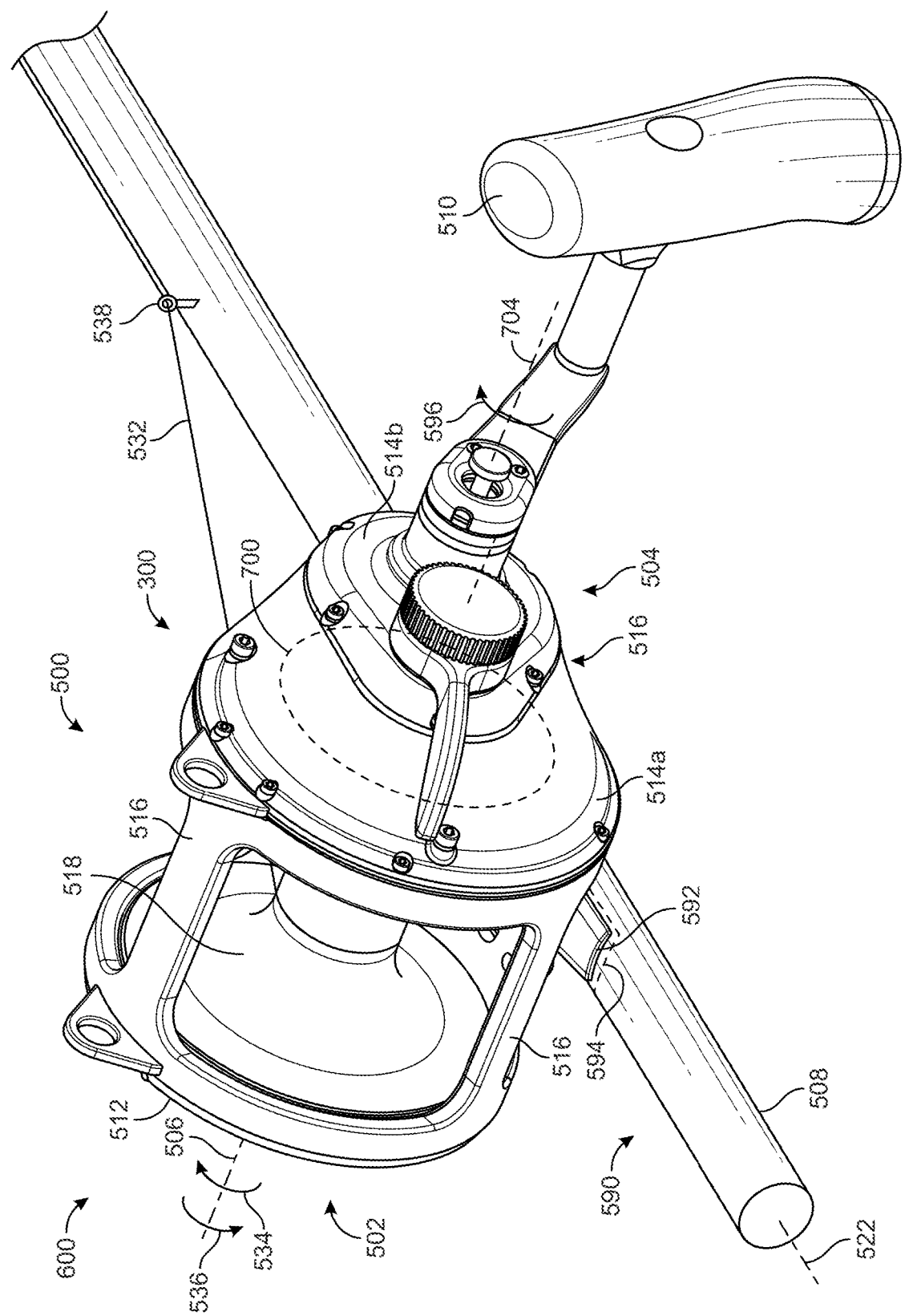
FIG. 15 is a perspective view of a fishing reel in which the anti-reverse mechanism of FIG. 1 may be used, according to an exemplary embodiment.

As shown in the exemplary embodiment of FIG. 15, a fishing rod assembly 600 (e.g., a line retrieval device, a baitcaster, a fishing apparatus, a fishing assembly, etc.) includes a reeling apparatus, a winding apparatus, a fishing line retrieval apparatus, etc., shown as reel 500 and a rod, a pole, a stick, an elongated member, etc., shown as rod 508. Reel 500 is configured to transition between a let-out state or configuration and a take-up state or configuration. In the take-up state, reel 500 is configured to draw, reel, wind, etc., fishing line 532. In the let-out state, reel 500 is configured to allow or facilitate the unwinding or unreeling of fishing line 532 such that fishing line 532 can be let out. Fishing rod assembly 600 is configured to be held in a fisherman's hand (e.g., a left hand or a right hand) and operated (e.g., reeled) with the fisherman's other hand (e.g., the right hand or left hand). For example, fishing rod assembly 600 is shown configured as a right-handed fishing rod, however, fishing rod assembly 600 may alternatively be configured as a left-handed fishing rod.

Rod 508 can be constructed of an organic material (e.g., bamboo), a metal (e.g., aluminum, steel, etc.), a composite, a graphite, a plastic, etc., or any other flexible material that also provides sufficient structural strength for fighting fish. Rod 508 can include multiple sections (e.g., a butt, a blank, a first and second section, a first second and third section, etc.) that are connected to each other. In some embodiments, subsequent sections of rod 508 are inserted into and fixedly coupled with prior sections of rod 508. Rod 508 can include one or more guides, eyelets, hooks, etc., shown as eyelet 538 at least partially along its entire length. The one or more guides may receive fishing line 532 therethrough and guide fishing line 532 from an outer end of rod 508 to reel 500.

Fishing rod assembly 600 also includes a user interface portion, a handle, a hand portion, etc., shown as handle 590. Handle 590 can be formed onto rod 508 at a position that is at least partially rearward of reel 500. Handle 590 can be molded or have a shape that corresponds to a fisherman's left or right hand to facilitate an ergonomic grip of fishing rod assembly 600. In some embodiments, handle 590 is a section that attaches to rod 508 at a position that is rearward of reel 500.

Rod 508 includes a receiving portion, a cleat, a seat, a recess, an interlocking portion, an interfacing portion, etc., shown as reel seat 594. Reel seat 594 is configured to receive and interlock with or fixedly couple with a corresponding portion or engagement member of reel 500, shown as reel foot 592. Reel foot 592 can be inserted at least partially into reel seat 594 and fixedly coupled (e.g., through fasteners, interlocking portions, etc.) with rod 508.

As shown in FIG. 15, reel 500 includes a body portion, a main portion, a housing, etc., shown as first body portion 512, and second body portion 514. Second body portion 514 includes housing member 514a and housing member 514b that cooperatively form second body portion 514. In some embodiments, first body portion 512 and second body portion 514 are positioned on opposite sides of reel 500. First body portion 512 is positioned at a first end 502 of reel 500, while second body portion 514 is positioned at a second end 504 that is opposite first end 502. In some embodiments, second end 504 is a handle side or a handle end.

Reel 500 includes a handle or a driver 510 (e.g., a handle) and a spool, bail, or take-up member, shown as spool 518. Handle 510 rotates about an axis 704 (e.g., a lateral axis) as a fisherman (e.g., by the fisherman's right hand) rotates handle 510 to reel or draw in fishing line 532. When handle 510 is driven to rotate about axis 704 by the fisherman and reel 500 is in the take-up configuration/state, spool 518 rotates in direction 536 about axis 506.

Handle 510 is drivable in direction 596 about an axis 704 to wind or reel fishing line 532 onto spool 518. In some embodiments, axis 704 is parallel with axis 506, but is offset (e.g., in a radial direction, etc.). As handle 510 is driven to rotate about axis 704, a shaft may also be driven to rotate about axis 704 in direction 596. The shaft can input mechanical energy (e.g., rotational kinetic energy, rotation, etc.) to a gear train, a gear box, a gearing system, etc., shown as gear set 700 of reel 500. As handle 510 is rotated in direction 596 about longitudinal axis 704, torque is transferred through the shaft to gear set 700 which is transferred to rotate spool 518 about longitudinal axis 506 in direction 536 to wind or reel or retract fishing line 532.

Referring still to FIG. 15, rod 508 defines and extends along an axis 522 (e.g., centrally through rod 508). In some embodiments, axis 522 is substantially perpendicular with axis 506. Fishing line 532 may extend along rod 508 in a direction along axis 522 throughout, but be taken up or wound onto spool 518 which rotates about axis 506 (e.g., a direction perpendicular with axis 522).

As shown in FIG. 15, reel 500 includes one or more supports 516 that extend between the first body portion 512 and the second body portion 514. Support members 516 can be integrally formed with the first body portion 512 and/or the second body portion 514 and may form a housing structure. Spool 518 is positioned between first body portion 512 and second body portion 514, with supports 516 extending between first body portion 512 and second body portion 514, at radial positions that are beyond an outer radial surface of spool 518.

Spool 518 can be configured to rotate in direction 536 about axis 506 when taking up fishing line 532, and rotate in direction 534 about axis 506 when letting out fishing line 532. In some embodiments, spool 518 is driven to rotate in direction 536 about axis 506 by rotation of handle 510 about axis 704 when fishing rod assembly 600 is in the take-up position or configuration. In some embodiments, spool 518 rotates in direction 534 to let-out fishing line, when fishing rod assembly 600 is in a let out position or configuration, or when a force above a threshold level is applied at an end of fishing line 532.

Figure 16:
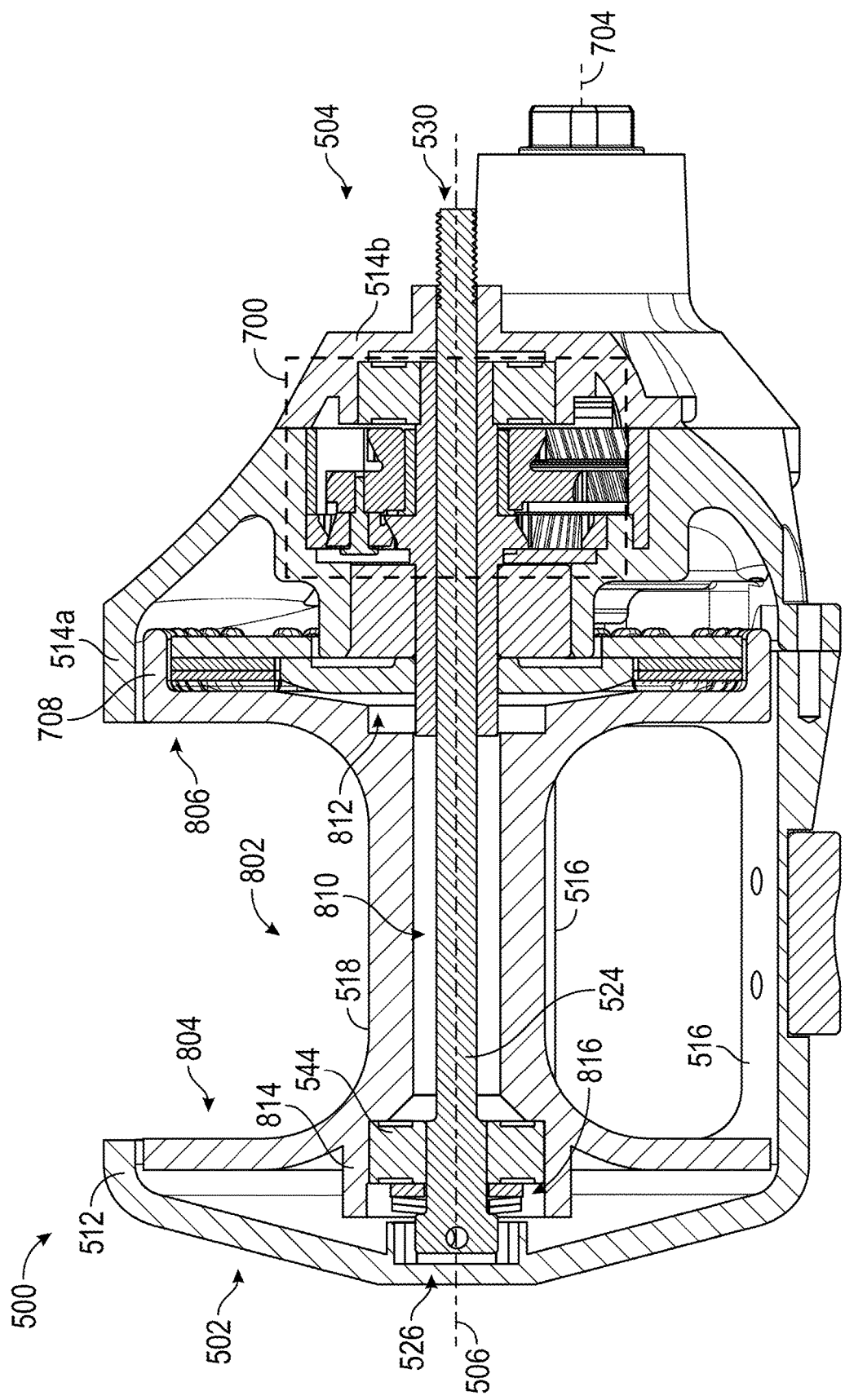
FIG. 16 is a side sectional view of the fishing reel of FIG. 15.
Figure 17:
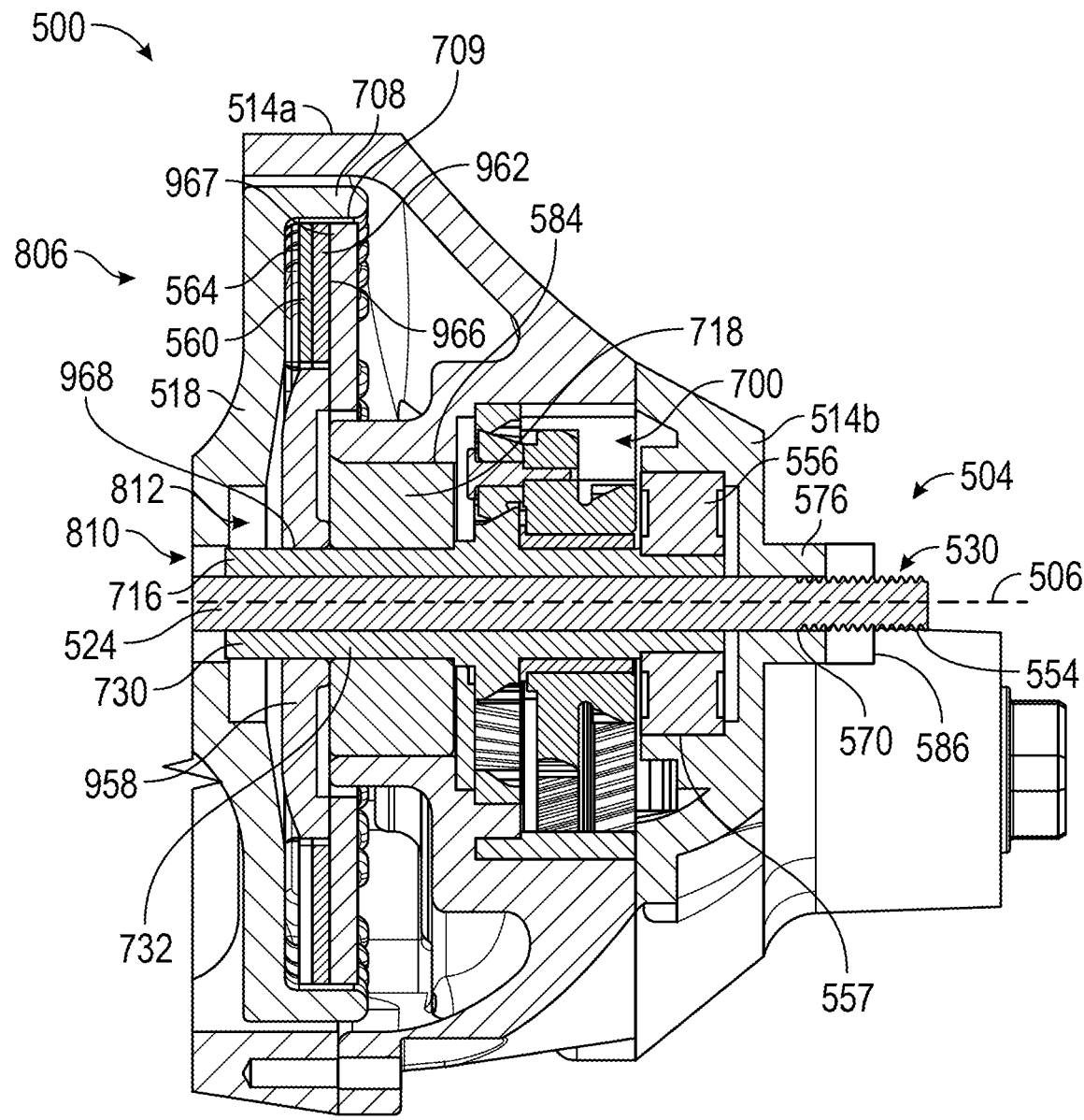
FIG. 17 is a side sectional view of a portion of the fishing reel of FIG. 15.

As shown in the exemplary embodiments of FIGS. 16-17, gear set 700 is positioned within an inner volume formed by housing member 514a and housing member 514b. Gear set 700 is configured to receive input torque or mechanical energy (e.g., rotational kinetic energy) from a user through handle 510. The input mechanical energy may be provided to handle 510 and rotate handle 510 about axis 704 (e.g., shown in FIG. 15). The input mechanical energy is transferred through gear set 700 to spool 518. In some embodiments, gear set 700 is configured to receive rotational kinetic energy at an input speed $\omega_{input}$ (e.g., about axis 704) and output rotational kinetic energy (e.g., to spool 518) at an output speed $\omega_{output}$ where $\omega_{output} > \omega_{input}$.

In one embodiment, gear set 700 is or includes a planetary gear set. In some embodiments, an input shaft of the gear set 700 receives kinetic energy from the handle In some embodiments, the gear set 700 includes an offset gear through which the torque is received from the handle 510. The offset gear or offset gear set may drive the planetary gear set of the gear set 700 which in turn drives the spool 518 through a drag mechanism 900. An output of the planetary gear set may drive a drag plate 958 of the drag mechanism. The output of the planetary gear set may be a shaft collar 716 that is fixedly coupled with an output gear of the planetary gear set 700 (e.g., with a sun gear of the planetary gear set).

According to the exemplary embodiment shown in FIG. 17, shaft collar 716 may include an interface 730 and a cylindrical portion 732. Interface 730 may have a generally square cross-sectional shape or one or more planar faces that are angled relative to each other (e.g., at 90 degrees). Interface 730 may have a square cross-sectional shape with chamfered or rounded corners.

Cylindrical portion 732 is integrally formed with interface 730 and may have the form of a shaft. Shaft collar 716 can also include a key that is configured to interface with, be received within, couple with, etc., a one-way bearing 718 (see FIG. 17). One-way bearing 718 mounts, is fixedly coupled with, is received within, etc., a bore 584 (e.g., a hole, a through-hole, a mounting structure, an aperture, etc.) of housing member 514a. An inner race of one-way bearing 718 may have an aperture, a groove, a channel, etc., that is configured to receive the key of shaft collar 716. The key may be fixedly coupled, integrally formed, adhered, secured, fastened, etc., with shaft collar 716.

Referring particularly to FIG. 17, shaft collar 716 is supported at an opposite end (e.g., an end of shaft collar 716 that is proximate the second end 504 of reel 500) through a bearing 556 (e.g., a ball-bearing, a roller bearing, a fluid bearing, a magnetic bearing, a plain bearing, etc.). Bearing 556 may be received within, pressed into, fixedly coupled within, mounted in, etc., a corresponding bore 557 of housing member 514b.

Spool 518 is also co-cylindrical with a spindle 524. In some embodiments, spindle 524 is configured to provide structural support for gear set 700. Spindle 524 is not driven by gear set 700, but provides support for the various components of gear set 700. Spindle 524 extends between first body portion 512 and second body portion 514 and may define axis 506, as shown in FIG. 16.

According to the exemplary embodiment shown in FIG. 16, spool 518 includes a central portion 802, a first outer portion 804 and a second outer portion 806. In some embodiments, central portion 802 has a hollow cylindrical shape through which spindle 524 extends. First outer portion 804 and second outer portion 806 are positioned at distal ends of central portion 802 (e.g., at first end 502 and second end 504, respectively). First outer portion 804 and second outer portion 806 may be integrally formed with or fixedly coupled with central portion 802. Central portion 802, first outer portion 804, and second outer portion 806 are all centered along axis 506. First outer portion 804 and second outer portion 806 extend radially outwards from a radially outer surface of central portion 802.

Spool 518 defines an inner volume, an opening, a bore, a through-hole, etc., shown as inner volume 810. Inner volume 810 extends along substantially an entire length of spool 518 (e.g., along axis 506) and receives spindle 524 therethrough. Inner volume 810 has an inner radius or diameter that is greater than an outer radius or diameter of spindle 524. In some embodiments, a gap is formed between a radial outer surface of spindle 524 and a radially inwards facing surface of spool 518. In some embodiments, inner volume 810 has a minimal inner radius or diameter that is substantially equal to or greater than an outer radius or outer diameter of shaft collar 716.

Spool 518 also includes an end portion 814 that is positioned at first end 502 of reel 500. End portion 814 is centered about axis 506 and may have a generally cylindrical shape. End portion 814 may be integrally formed with spool 518 (e.g., with first outer portion 804). In some embodiments, end portion 814 extends along axis 506 beyond an outer periphery of first outer portion 804.

End portion 814 may define an inner volume 816 that is coupled with or a portion of inner volume 810. In some embodiments, inner volume 816 is a bore or a hole that has an inner diameter or inner radius greater than an inner diameter or inner radius of inner volume 810. Spindle 524 can extend through inner volume 810 and inner volume 816. More particularly, a medial portion of spindle 524 extends through inner volume 810, while second end 526 of spindle 524 extends through inner volume 816. In some embodiments, the second end 526 of spindle 524 is received within and translatable relative to the first body portion 512.

Referring particularly to FIG. 16, reel 500 includes a bearing 544 (e.g., a ball-bearing, a roller bearing, a fluid bearing, a magnetic bearing, a plain bearing, etc.) that is configured to support second end 526 of spindle 524. Bearing 544 can be received within (e.g., press fit, slip fit, etc.) end portion 814. Bearing 544 is positioned within inner volume 816 of end portion 814 such that a radially outwards facing surface of bearing 544 (e.g., a radially outwards facing surface of an outer race of bearing 544) engages, contacts, etc., a corresponding radially inwards facing surface of end portion 814. In some embodiments, an outer radius or outer diameter of bearing 544 is substantially equal to an inner radius or inner diameter of end portion 814.

The reel 500 may also includes a washer and a spring washer. The washer can be positioned within inner volume 816 of spool 518 and may abut, directly contact, engage, etc., a corresponding surface of bearing 544 (e.g., an outer surface of bearing 544). The spring washer may bias the spool 518 to bias or translate in a direction towards the second end 504. In other embodiments, other resilient members bias spool 518, or spool 518 is otherwise biased.

Figure 18:
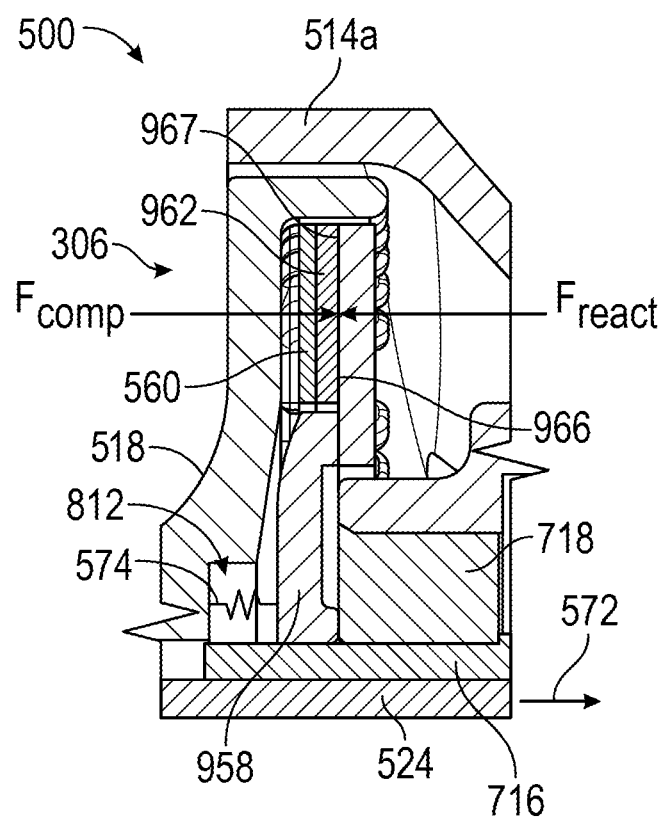
FIG. 18 is a side sectional view of a drag mechanism of the fishing reel of FIG. 15.

Referring to FIGS. 17 and 18, the drag mechanism 900 of the reel 500 includes an interfacing member, a disc member, a drive member, etc., shown as drag plate 958. Drag plate 958 is centered about axis 506 and is configured to rotate about axis 506. Drag plate 958 is rotatably fixedly coupled with shaft collar 716 so that drag plate 958 receives rotational kinetic energy output, mechanical energy output, torque output, etc., of gear set 700. Drag plate 958 extends radially outwards from an exterior surface of shaft collar 716 to approximately a radially inwards facing surface 709 of a tab portion 708 of spool 518. Tab portion 708 may extend in a direction along axis 506 (e.g., toward second end 504 of reel 500) at a radially outer position (e.g., a radially outermost position) of second outer portion 806.

Drag plate 958 can be positioned proximate, adjacent to, or directly next to one-way bearing 718. Drag plate 958 includes a central opening 968 (e.g., a through-hole, a bore, an interfacing hole, etc.) that is configured to facilitate the fixed coupling (e.g., rotationally fixing shaft collar 716 and drag plate 958 together). Drag plate 958 may be coupled with shaft collar 716 at or along interface 730. In some embodiments, central opening 968 has a cross-sectional shape (e.g., an opening or aperture shape) that corresponds to or is configured to interface with a cross-sectional shape of interface 730 of shaft collar 716. For example, central opening 968 may have a square shape which corresponds to the square shape of interface 730.

Drag plate 958 may extend in a radial-only direction, or may be stepped as shown in FIG. 17. For example, drag plate 958 may extend radially outwards a first distance, then extend in a direction along axis 506 (e.g., towards second end 504), then extend further radially outwards. In this way, drag plate 958 may be contoured to fit within housing member 514*a*, and may at least partially overlap one-way bearing 518.

Referring still to FIGS. 17 and 18, the drag mechanism 900 of the reel 500 includes a friction plate, a brake plate, etc., shown as brake disc 962. Brake disc 962 includes or defines an engagement surface, a frictional surface, an outer surface, etc., shown as engagement surface 966. The drag mechanism 900 of the reel 500 also includes a backing plate, a brake plate, etc., shown as brake backing plate 960. Brake backing plate 960 is configured to facilitate fixed coupling, attachment, mounting, etc., of brake disc 962 with spool 518. In particular, brake backing plate 960 can be fixedly coupled with a lateral face 564 of spool 518, or more particularly, of second outer portion 806. Brake backing plate 560 is fixedly coupled with lateral face 564 of spool 518 on one side and fixedly couples with brake disc 962 along an opposite lateral side or surface.

An outer portion of drag plate 958 defines an engagement surface, a lateral surface, an engagement face, etc., shown as engagement face 967. Engagement face 967 may contact, directly abut, engage, directly touch, etc., engagement surface 966 of brake disc 962, thereby forming a frictional engagement or a frictional interface between brake disc 962 and drag plate 958. In this way, rotational kinetic energy can be transferred from the gear set 700, though the drag plate 958 and the frictional engagement (between brake disc 962 and drag plate 958) to spool 518 to drive spool 518 to rotate.

A strength or a frictional force of the frictional interface is related to a compressive force that exists between the engagement surface 966 of brake disc 962 and the engagement face 967 of drag plate 958, a surface area that is exposed between the engagement surface 966 of brake disc 962 and the engagement face 967 of drag plate 958, and a static coefficient of friction $\mu_{static}$ of the material of brake disc 962. In some embodiments, the compressive force between the spool 518 and the drag plate 958 is adjustable (e.g., by the fisherman). For example, as discussed in greater detail above, spool 518 may translate along axis 506.

Spindle 524 can translate along axis 506 relative to shaft collar 716. When spindle 524 translates in direction 572, the second end 526 of spindle 524 catches spool 518 (e.g., through the spring washer, washer, and bearing 544) and draws spool 518 in direction 572 relative to shaft collar 716. Translation of spool 518 in direction 572 (shown in FIG. 18) results in brake disc 962 being pressed against, driven into, forced into engagement with, etc., drag plate 958. Specifically, translation of spool 518 in direction 572 increases a compressive force between engagement surface 966 and engagement face 967. Increasing the compressive force therebetween engagement surface 966 and engagement face 967 increases a strength of the frictional engagement therebetween (e.g., increases a maximum frictional torque or a maximum frictional force).

According to the exemplary embodiment shown in FIG. 18, the compressive force between brake disc 962 and drag plate 958 is shown, according to an exemplary embodiment. As spool 518 is translated in direction 572, a compressive force $F_{comp}$ exerted by brake disc 962 may be increased, thereby resulting in an increased reactionary force $F_{react}$ that is exerted by drag plate 958.

Referring still to FIG. 18, reel 500 may include a spring 574 that is positioned between the spool 518 and the drag plate 958. Spring 574 may be positioned within inner volume 812 that is formed between spool 518 and drag plate 958. Spring 574 functions to provide a reactionary or expansive force when spring 574 is compressed due to translation of spool 518 in direction 572 relative to shaft collar 716 and drag plate 958. Spring 574 can facilitate returning spool 518 back to an original or rest position when spool 518 is not driven to translate along axis 506.

Fishing Reel with Anti-Reverse Mechanism

Figure 19:
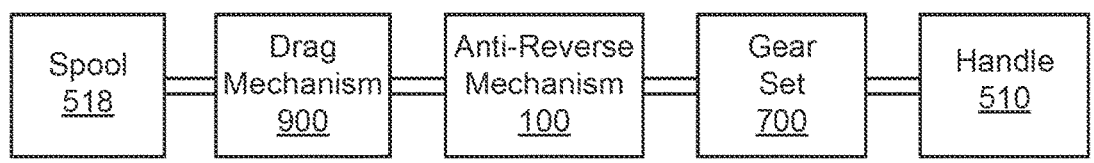
FIG. 19 is a diagram showing a first configuration of the fishing reel of FIGS. 15-18 using the anti-reverse mechanism of FIGS. 1-14, according to an exemplary embodiment.

As shown in FIG. 19, the reel 500 may include the anti-reverse mechanism 100, the gear set 700, the drag mechanism 900, and the spool 518, according to an exemplary embodiment. It should be understood that the reel 500 as described herein may include any of the structure, members, features, etc., of the reel 500 as described in greater detail above with reference to FIGS. 15-18. In some embodiments, the reel 500 includes any of the structure, features, members, systems, sub-systems, assemblies, etc., of the reel 100 as described in greater detail in U.S. application Ser. No. 17/473,876, filed Sep. 13, 2021, the entire disclosure of which is incorporated by reference herein.

As shown in FIG. 19, the handle 510 may receive input torque or rotation from a fisherman or user. The handle 510 transfers the torque to the gear set 700 (e.g., to an input gear). The gear set 700 may transfer the torque to the spool 518 (e.g., via an output gear or an output shaft) for retrieving fishing line onto the spool 518 through the anti-reverse mechanism 100 and the drag mechanism 900. The anti-reverse mechanism 100 may function as the one-way bearing 718 or entirely replace the one-way bearing 718. In some embodiments, the anti-reverse mechanism 100 is integrated structurally with the gear set 700. For example, the anti-reverse mechanism 100 can be positioned at an output of the gear set 700 between the gear set 700 and the drag mechanism 900. The fishing reel frame 102 of the anti-reverse mechanism 100 can be second body portion 514. The anti-reverse mechanism 100 may allow rotation of the spool 518 and the gear set 700 but limit reverse rotation of the gear set 700 when a fish pulls on an opposite end of the line (e.g., while wrangling a fish). When the fish pulls on the opposite end of the line, the anti-reverse mechanism 100 can limit rotation (e.g., through locking of the pawls as described in greater detail above with reference to FIGS. 1-14), the spool 518 may still let out fishing line due to the drag mechanism 900 and the frictional engagement of the drag mechanism 900. In this way, the drag mechanism 900 and the anti-reverse mechanism 100 can function such that the gear set 700, the anti-reverse mechanism 100, the drag mechanism 900, and the spool 518 all rotate to take up fishing line as the spool rotates 518 in a first direction, but the only the spool 518, and a portion of the drag mechanism 900 coupled with the spool 518 rotate when the spool 518 rotates in a second direction (e.g., to let out fishing line while wrangling the fish in a controlled manner due to the drag exerted on the spool 518). In some embodiments, the drive member 104 or the driveshaft 110 of the anti-reverse mechanism 100 is rotatably coupled (e.g., directly or indirectly though other gears or through the drag mechanism 900) with the spool 518 of the reel 500.

Figure 20:
FIG. 20 is a diagram showing a second configuration of the fishing reel of FIGS. 15-18 using the anti-reverse mechanism of FIGS. 1-14, according to an exemplary embodiment.

As shown in FIG. 20, the reel 500 may include the anti-reverse mechanism 100, the gear set 700, and the drag mechanism 900, and the spool 518, according to another exemplary embodiment. The anti-reverse mechanism 100 can be positioned between the handle 510 and the gear set 700 (e.g., at an input side of the gear set 700). In this way, when the handle 510 is driven to take up fishing line, the anti-reverse mechanism 100 allows the gear set, the drag mechanism 900 and the spool 518 to rotate to take up the fishing line (e.g., when the spool 518 rotates in a first direction). However, when the spool 518 is driven to rotate in a second direction as the fishing line is let out (e.g., due to a tensile force on the fishing line exerted by a fish), the gear set 700 may be prevented from being back driven due to the anti-reverse mechanism 100.

In other embodiments, the anti-reverse mechanism 100 is implemented in a spinning reel, a children's fishing reel, etc., or any other fishing reel configured to take up line by rotation of a spool, or configured to be driven by a handle.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A fishing reel comprising:
    a frame; and
    an anti-reverse mechanism comprising:
        a drive member;
        a ratchet plate rotatably coupled with the drive member;
        a biasing member frictionally engaged with the ratchet plate and the drive member, wherein the biasing member is positioned within a space between the ratchet plate and an annular protrusion of the drive member, the biasing member configured to float within the space between the ratchet plate and the annular protrusion of the drive member; and
        a plurality of engagement members pivotally coupled with the frame and configured to be pivoted by the biasing member as the biasing member rotates, the plurality of engagement members configured to be driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

2. The fishing reel of claim 1, wherein the plurality of engagement members are pawls.

3. The fishing reel of claim 1, wherein the plurality of engagement members are not driven to pivot by springs.

4. The fishing reel of claim 1, wherein the space between the ratchet plate and the annular protrusion of the drive member is filled with a lubricant.

5. The fishing reel of claim 1, wherein each of the plurality of engagement members comprises a hooked end configured to engage teeth of the ratchet plate.

6. The fishing reel of claim 1, wherein the plurality of engagement members are pivotable relative to the frame an angular amount between a first angular position and a second angular position, wherein in the first angular position the plurality of engagement members are configured to engage the ratchet plate to limit further rotation of the drive member in the second direction, and wherein in the second angular position, the plurality of engagement members do not engage the ratchet plate to allow further rotation of the drive member in the first direction.

7. The fishing reel of claim 6, wherein the plurality of engagement members are transitionable between the first angular position and the second angular position by the drive member and the biasing member rotating in the first direction or the second direction a corresponding angular amount.

8. The fishing reel of claim 1, wherein the drive member is configured to drive a spool of the fishing reel through a drag mechanism, the drag mechanism configured to allow rotation of the spool in a direction that back-drives the drive member in the second direction such that the plurality of engagement members limit further rotation of the ratchet plate, wherein the spool rotates in the direction to let out fishing line while the drag mechanism exerts drag on the spool.

9. The fishing reel of claim 1, wherein rotation of the drive member causes the plurality of engagement members of the anti-reverse mechanism to transition between an engaged position in which the plurality of engagement members engage the ratchet plate to limit rotation of the drive member in the second direction, and a disengaged position in which the plurality of engagement members do not engage the ratchet plate to allow rotation of the drive member in the first direction.

10. A fishing rod assembly comprising:
    a rod; and
    a fishing reel comprising:
        a frame; and
        an anti-reverse mechanism comprising:
            a drive member;
            a ratchet plate rotatably coupled with the drive member;
            a biasing member frictionally engaged with the ratchet plate and the drive member, wherein the biasing member is positioned within a space between the ratchet plate and an annular protrusion of the drive member, the biasing member configured to float within the space between the ratchet plate and the annular protrusion of the drive member;
            a plurality of engagement members pivotally coupled with the frame and configured to be pivoted by the biasing member as the biasing member rotates, the plurality of engagement members configured to be driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

11. The fishing rod assembly of claim 10, wherein the plurality of engagement members are pawls.

12. The fishing rod assembly of claim 10, wherein the plurality of engagement members are not driven to pivot by springs.

13. The fishing rod assembly of claim 10, wherein the space between the ratchet plate and the annular protrusion of the drive member is filled with a lubricant.

14. The fishing rod assembly of claim 10, wherein the plurality of engagement members comprise a hooked end configured to engage teeth of the ratchet plate.

15. The fishing rod assembly of claim 10, wherein the plurality of engagement members are pivotable relative to the frame an angular amount between a first angular position and a second angular position, wherein in the first angular position the plurality of engagement members are configured to engage the ratchet plate to limit further rotation of the drive member in the second direction, and wherein in the second angular position, the plurality of engagement members do not engage the ratchet plate to allow further rotation of the drive member in the first direction, wherein the plurality of engagement members are transitionable between the first angular position and the second angular position by the drive member and the biasing member rotating in the first direction or the second direction a corresponding angular amount.

16. The fishing rod assembly of claim 10, wherein the drive member is configured to drive a spool of the fishing reel through a drag mechanism, the drag mechanism configured to allow rotation of the spool in a direction that back-drives the drive member in the second direction such that the plurality of engagement members limit further rotation of the ratchet plate, wherein the spool rotates in the direction to let out fishing line while the drag mechanism exerts drag on the spool.

17. The fishing rod assembly of claim 10, wherein rotation of the drive member causes the plurality of engagement members of the anti-reverse mechanism to transition between an engaged position in which the plurality of engagement members engage the ratchet plate to limit rotation of the drive member in the second direction, and a disengaged position in which the plurality of engagement members do not engage the ratchet plate to allow rotation of the drive member in the first direction.

18. An anti-reverse mechanism for a fishing reel, the anti-reverse mechanism comprising:
　a drive member;
　a ratchet plate rotatably coupled with the drive member;
　a biasing member frictionally engaged with the ratchet plate and the drive member, wherein the biasing member is positioned within a space between the ratchet plate and an annular protrusion of the drive member, the biasing member configured to float within the space between the ratchet plate and the annular protrusion of the drive member;
　a plurality of engagement members pivotally coupled with a frame and configured to be pivoted by the biasing member as the biasing member rotates, the plurality of engagement members configured to be driven to pivot out of engagement with the ratchet plate as the biasing member rotates in a first direction to allow rotation of the drive member in the first direction, and configured to be driven to pivot into engagement with the ratchet plate as the biasing member rotates in a second direction to limit further rotation of the drive member in the second direction.

* * * * *